United States Patent Office 3,189,636
Patented June 15, 1965

3,189,636
ALLENIC PHOSPHORUS COMPOUNDS
Armand Boisselle, Cleveland, Ohio, assignor to The Lubrizol Corporation, Wickliffe, Ohio, a corporation of Ohio
No Drawing. Filed Dec. 8, 1961, Ser. No. 158,137
8 Claims. (Cl. 260—461)

This invention relates to organic phosphorus compounds and in a more particular sense to allenic phosphinyl compounds.

Organic phosphorus compounds are useful as weed killers, anti-oxidants, pesticides, corrosion inhibitors, extreme-pressure lubricant additives, etc. In many of these applications, the presence within the molecular structure of the organic phosphorus compounds of an unsaturated linkage, such as an olefinic linkage enhances their utility. The unsaturated linkage imparts, e.g., the ability to undergo polymerization so that useful polymeric phosphorus compounds can be prepared. It also imparts the ability to react with halogen or halogen-containing compounds to form phosphorus-containing, and halogen-containing products useful as insecticides. Accordingly, it is an object of this invention to provide novel compositions of matter, viz., organic phosphorus compounds in which the organic radicals contain unsaturated linkages.

It is also an object of this invention to provide allenic phosphinyl compounds, and methods for their preparation.

These and other objects are achieved in accordance with this invention by providing an allenic phosphinyl compound having the structural formula

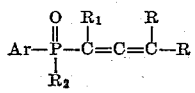

wherein
(a) Ar is an aryl radical;
(b) R is selected from the class consisting of hydrogen, lower alkyl, and cycloalkyl radicals;
(c) $R_1$ is selected from the class consisting of hydrogen, lower alkyl and

radicals;
(d) and $R_2$ is selected from the class consisting of aryl and

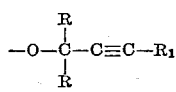

radicals.

It will be noted that compounds having either of the above structural formulas have not been known in the art. The term "allenic phosphinyl compound" appears to be a convenient and sufficiently accurate name for these compounds and is, therefore, used throughout the specification and claims of this invention.

The aromatic radical (i.e., Ar) is, for the most part, an aryl radical such as phenyl or naphthyl radical and may be a substituted phenyl or naphthyl radical in which the substituent is an alkyl radical such as methyl, ethyl, propyl, isopropyl, dodecyl, octadecyl, or a polyisobutene (molecular weight of 5000) radical. The substituent may be a polar radical such as a halo radical, e.g., chloro, bromo, or iodo radical. Also, more than one such substituent may be present in the phenyl or naphthyl radical. Specific examples of the aromatic radical include phenyl, naphthyl, o-tolyl, alpha-methyl-beta-naphthyl, o,p-di-n-propylphenyl, p-octylphenyl, o-chlorophenyl, p-nitrophenyl, m-methoxyphenyl, o,p-dichlorophenyl, p-polypropene (molecular weight of 250)-substituted phenyl, and m-cyclohexylphenyl radicals. In the case where two aromatic radicals are attached to the phosphorus atom, they may be the same or different radicals.

The radicals R and $R_1$ each may be a lower alkyl or cycloalkyl radical, i.e., one having less than about seven carbon atoms. These radicals are illustrated by methyl, ethyl, isopropyl, n-propyl, n-butyl, sec-butyl, isobutyl, tert-butyl, cyclopentyl, cyclohexyl, and methylcyclopentyl radicals. In many instances the radicals R and $R_1$ each are hydrogen.

Specific examples of the allenic phosphinyl compounds include the following compounds:

(A) 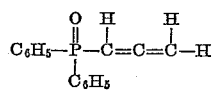

(B) 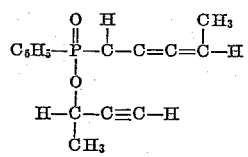

(C) 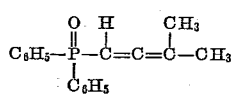

(D) 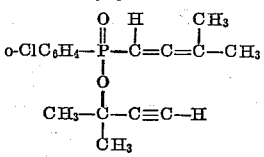

(E) 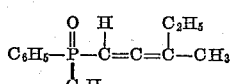

(F) 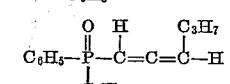

(G) 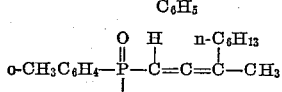

(I) 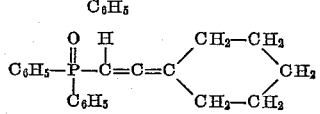

(J) 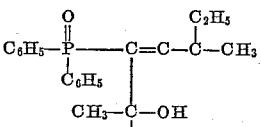

(K) 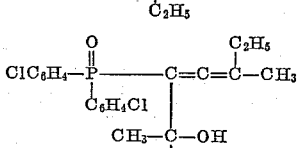

(L) 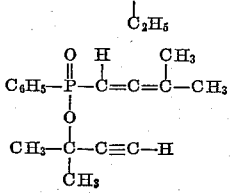

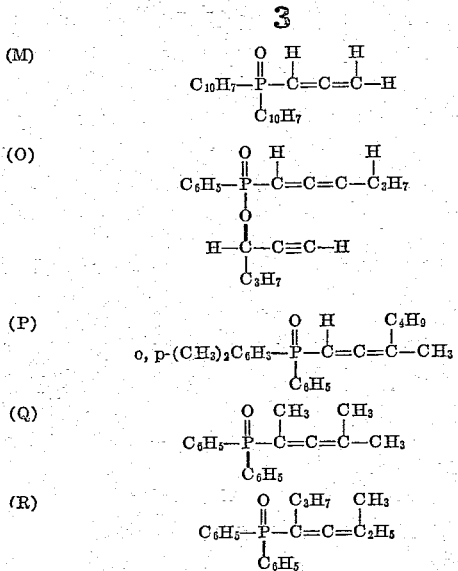

(M)
$$C_{10}H_7-\overset{O}{\overset{\|}{P}}-\overset{H}{\overset{|}{C}}=C=\overset{H}{\overset{|}{C}}-H$$
$$\overset{|}{C_{10}H_7}$$

(O)
$$C_6H_5-\overset{O}{\overset{\|}{P}}-\overset{H}{\overset{|}{C}}=C=\overset{H}{\overset{|}{C}}-C_3H_7$$
$$\overset{|}{\underset{}{O}}$$
$$H-\overset{}{\underset{C_3H_7}{\overset{|}{C}}}-C\equiv C-H$$

(P)
$$o,p\text{-}(CH_3)_2C_6H_3-\overset{O}{\overset{\|}{P}}-\overset{H}{\overset{|}{C}}=C=\overset{C_4H_9}{\overset{|}{C}}-CH_3$$
$$\overset{|}{C_6H_5}$$

(Q)
$$C_6H_5-\overset{O}{\overset{\|}{P}}-\overset{CH_3}{\overset{|}{C}}=C=\overset{CH_3}{\overset{|}{C}}-CH_3$$
$$\overset{|}{C_6H_5}$$

(R)
$$C_6H_5-\overset{O}{\overset{\|}{P}}-\overset{C_3H_7}{\overset{|}{C}}=C=\overset{CH_3}{\overset{|}{C}}-C_2H_5$$
$$\overset{|}{C_6H_5}$$

A method for preparing the allenic phosphinyl compounds of this invention involves the reaction of an aromatic halophosphine (e.g., a diarylphosphinous halide or an arylphosphonous dihalide) with an alpha-hydroxy-alkyne of the structural formula

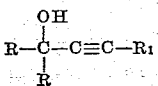

in which R and R₁ are as defined previously. The reaction is illustrated by Equation A, Equation B, or Equation C below:

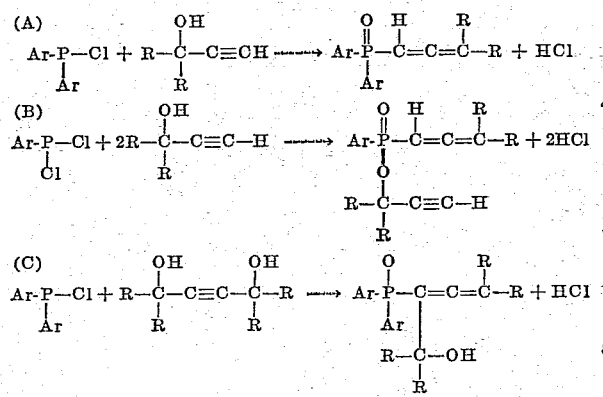

The radicals Ar and R likewise are as defined previously. It will be noted that in Equations A and C the phosphorus reactant is a di-aromatic phosphinous chloride whereas in Equation B the phosphorus reactant is an aromatic phosphonous dichloride. It will be noted also that the product in Equation B derived from an aromatic phosphonous dihalide is otherwise known as a phosphonate which, for the purposes of this invention, is included in the generic description of the allenic phosphinyl compounds.

The above reaction is carried out in the presence of a base which functions as an acceptor of the hydrogen chloride formed during the reaction. The base is usually an organic amine, preferably an aromatic or heterocyclic amine such as aniline, phenylenediamine, pyridine, or pyrrole. Aliphatic amines likewise are useful, and they include methyl amine, dimethyl amine, trimethyl amine, cyclohexyl amine, dodecyl amine, didodecyl amine, N-methyl cyclohexyl amine, etc.

Ordinarily, chemically equivalent amounts of the aromatic halophosphine and the hydroxy-alkyne are used in the reaction. The use of an excess of either reactant is permissible. The equivalent weights of the aromatic halophosphine and the hydroxy-alkyne are based upon the number of halo-radicals, or hydroxy-radicals, in the respective reactant. To illustrate, a di-aromatic phosphinous chloride has one equivalent per mole, an aromatic phosphonous dichloride has two equivalents per mole, and a mono-hydroxy-alkyne has one equivalent per mole.

Inasmuch as the base acts to receive the hydrogen chloride, the minimum amount of the base to be used in the reaction mixture depends upon the amount of the hydrogen chloride which will be formed in the reaction. Thus, there should be at least one mole of the base for each mole of a di-aromatic phosphinous halide used, and at least two moles of the base for each mole of an aromatic phosphonous dihalide used. In general, a slight excess of the base, such as 20% on a molar basis, is desirable.

The use of a solvent in the above reaction is advantageous, although optional in many instances. The most commonly used solvent is an ether such as dimethyl ether, diethyl ether, methyl isopropyl ether, tetrahydrofuran, or dioxane. It may likewise be benzene, naphtha, toluene, n-hexane, or any other inert solvent.

The reaction is carried out at a relatively low temperature, i.e., less than about 25° C., preferably between 0° and 10° C. It can be carried out at a temperature below 0° C. such as —25° C. or lower, but a temperature higher than room temperature tends to cause decomposition or discoloration of the reaction mixture. The reaction is slightly exothermic and occurs readily upon mixing the aromatic halophosphine and the alpha-hydroxy-alkyne in the presence of the base. After the reaction is complete, the hydrochloride of the base, e.g., pyridine hydrochloride is removed by filtration or by extraction with water. The remainder of the reaction mixture contains the desired allenic phosphinyl compound which may be further purified by filtration, solvent recrystallization (in the case of a solid product), or any other known technique.

The following examples illustrate the methods for preparing the allenic phosphinyl compounds of this invention:

*Example 1*

To a mixture of 42 grams (0.5 mole) of 3-methyl-3-hydroxy-1-butyne, 40 grams (0.5 mole) of pyridine, and 100 cc. of benzene, there is added 110 grams (0.5 mole) of diphenylphosphinous chloride, dropwise throughout a period of 5 hours while the reaction is maintained at a temperature below 8° C. by means of an ice-water bath. The resulting mixture is stirred at 0°–5° C. for 1 hour and allowed to stand overnight at room temperature. The pyridine hydrochloride is removed by filtration and the filtrate is diluted with ether, washed with dilute hydrochloric acid, and dried by contact with anhydrous potassium carbonate. The dried residue is heated to 50° C./12 mm. whereupon the volatile solvents are removed by distillation. The residue comprises the allenic phosphinyl compound of the structural Formula C above, and is found to have a phosphorus content of 11.3% (theory: 11.6%). A portion of the crude allenic phosphinyl compound is recrystallized from petroleum ether and the recrystallized product is found to have a melting point of 70°–73° C. Both the crude and the purified products exhibit maximum infrared absorption at the following wavelengths (reciprocal centimeters): 1950 (characteristic of the allenic radical), 1170 (characteristic of the P=O radical), and 1430 (characteristic of the phenyl-P-radical).

*Example 2*

Phenylphosphonous dichloride (60 grams, 0.33 mole) is added dropwise throughout a period of 4 hours to a mixture of 56 grams (0.66 mole) of 3-methyl-3-hydroxy-1-butyne, 55 grams (0.66 mole) of pyridine, and 150 cc. of diethyl ether maintained at a temperature below 10° C. by means of an ice bath. Thereafter the mixture is stirred at 0°–5° C. for 1 hour and allowed to stand overnight at room temperature. The pyridine hydrochloride is removed by washing the reaction mixture with 300 cc. of water and the aqueous layer is extracted with ether. The organic layer is combined with the ether extract, washed with dilute hydrochloric acid, and then dried by contact with anhydrous potassium carbonate. Ether is then removed by distillation at 45° C./10 mm. The residue comprises the allenic phosphinyl compound of structural Formula L above. It has a phosphorus content of 11.5% (theory: 11.3%) and exhibits maximum infrared absorption at the following wavelengths (reciprocal centimeters): 3285 and 3200 (characteristic of —C≡CH radical), 2110 (characteristic of —C≡C— radical), 1950 (characteristic of the allenic radical), 1240–1220 (characteristic of P=O radical having a hydrocarbon-oxy radical attached to the phosphorus atom), and 1430 (characteristic of the phenyl-P radical).

*Example 3*

A solution of diphenyl phosphinous chloride (88 grams, 0.4 mole) in ether (25 cc.) is added to a solution of 3,6-dimethyl-3,6-di-hydroxy-4-octyne (68 grams, 0.4 mole) and pyridine (32 grams, 0.4 mole) in 125 cc. of ether throughout a period of 4 hours at 0°–10° C. The resulting mixture is then allowed to stand at room temperature overnight. The mixture is then washed with water (to remove pyridine hydrochloride) and dried by contact with anhydrous potassium carbonate. Ether is allowed to evaporate to a residual, viscous oil having a phosphorus content of 8.6% and comprising the allenic phosphinyl compound of structural Formula J above (theory of phosphorus content: 8.7%). The structure of the product is confirmed by its infrared absorption which exhibits maxima at the following wave-lengths (reciprocal centimeters): 1950 (characteristic of the allenic radical), 1190–1160 (characteristic of the P=O radical), 3420 (characteristic of —OH radical), 3420 (characteristic of the C—OH radical), and 1430 (characteristic of phenyl-P radical).

*Example 4*

The allenic phosphinyl compound of structural Formula A above is prepared by the procedure of Example 1 except that the 3-methyl-3-hydroxy-1-butyne is replaced, on a molar basis, with 3-hydroxy-1-propyne and pyridine is replaced, on a molar basis, with triethylamine.

*Example 5*

The allenic phosphinyl compound of the structural Formula E is prepared by the procedure of Example 1 except that the 3-methyl-3-hydroxy-1-butyne is replaced, on a molar basis, with 3-methyl-3-hydroxy-1-pentyne, and pyridine is replaced, on a molar basis, with triethylamine.

*Example 6*

The allenic phosphinyl compound of the structural Formula F is prepared by the procedure of Example 1 except that the 3-methyl-3-hydroxy-1-butyne is replaced, on a molar basis, with 3-hydroxy-1-hexyne.

*Example 7*

The allenic phosphinyl compound of the structural Formula I is prepared by the procedure of Example 1 except that the 3-methyl-3-hydroxy-1-butyne is replaced, on a molar basis, with 1-ethynyl-1-cyclohexanol.

*Example 8*

The allenic phosphinyl compound of the structural Formula K is prepared by the procedure of Example 3 except that the diphenyl phosphinous chloride is replaced, on a molar basis, with bis(chlorophenyl)phosphinous chloride.

*Example 9*

The allenic phosphinyl compound of the structural Formula O is prepared by the process of Example 2 except that the 3-methyl-3-hydroxy-1-butyne is replaced with 3-hydroxy-1-hexyne, and pyridine is replaced, on a molar basis, with triethyl amine.

The allenic phosphinyl compounds are useful as weed killers, insecticides, anti-oxidants, corrosion-inhibitors, and load-carrying additives in lubricants. A specific illustration of such utility is the application to tomato plants of an insecticidal composition comprising an aqueous emulsion of 95 parts (by weight) of water, 4 parts of kerosene, 1 part of the allenic phosphinyl compound of the structural Formula K, and 0.2 part of sodium dodecylbenzene sulfonate (emulsifier). The composition is useful as a spray and is effective to control the infestation of insects on vegetation.

Another example of the utility of the allenic phosphinyl compounds of this invention is the use in the crankcase of an internal combustion engine of a lubricant comprising 98 parts (by weight) of a SAE 20 mineral lubricating oil and 2 parts of the allenic phosphine of the structural Formula I. The presence of the allenic phosphinyl compound improves the oxidation resistance and the load-carrying properties of the lubricant. The lubricant is useful as a crankcase lubricant for an automobile.

The efficacy of the additives of this invention to impart load-carrying properties to lubricants is shown by the Timken OK Load Test (ASTM Bulletin No. 181, April 1, 1952) which measures the load at which the rupture of a film of the lubricant between the rotating cup and a stationary block and the surface distress (e.g., scoring, abrasion) of the stationary block occur. Thus, the higher the load, the better the load-carrying properties of the lubricant. The results are shown in the following table.

| Lubricant tested: | Test result (OK load-pounds) |
|---|---|
| SAE 90 mineal oil | 5. |
| SAE 90 mineral oil + 1.15% (by weight) of the allenic phosphine of structural Formula J | 8, 10 (duplicate). |

What is claimed is:

1. An allenic phosphinyl compound having the structural formula

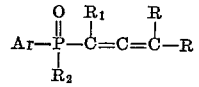

wherein
  (a) Ar is a member selected from the group consisting of phenyl, napthyl, alkylphenyl, alkylnaphthyl, halophenyl, nitrophenyl and alkoxyphenyl;
  (b) R is a member selected from the group consisting of hydrogen, lower alkyl, and cycloalkyl;
  (c) $R_1$ is a member selected from the group consisting of hydrogen, lower alkyl and

and
  (d) $R_2$ is a member selected from the group consisting of Ar and

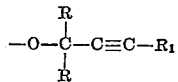

2. An allenic phosphinyl compound having the structural formula

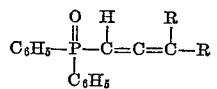

wherein R is lower alkyl.

3. An allenic phosphinyl compound having the structural formula

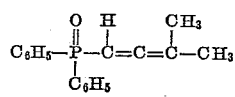

4. An allenic phosphinyl compound having the structural formula

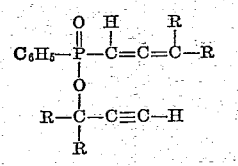

wherein R is lower alkyl.

5. An allenic phosphinyl compound having the structural formula

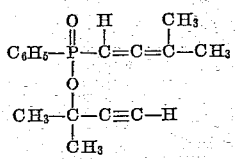

6. An allenic phosphinyl compound having the structural formula

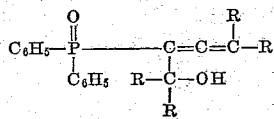

wherein R is lower alkyl.

7. An allenic phosphinyl compound having the structural formula

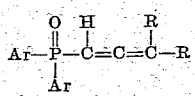

wherein Ar is phenyl and R is cycloalkyl.

8. An allenic phosphinyl compound having the structural formula

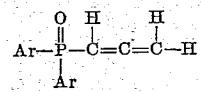

wherein Ar is phenyl.

References Cited in the file of this patent

UNITED STATES PATENTS

| | | |
|---|---|---|
| 2,167,867 | Benning | Aug. 1, 1939 |
| 2,174,019 | Sullivan | Sept. 26, 1939 |
| 2,711,403 | Stiles et al. | June 21, 1955 |
| 2,908,605 | Beriger et al. | Oct. 13, 1959 |
| 2,920,094 | Fekete | Jan. 5, 1960 |
| 2,971,019 | Ladd et al. | Feb. 7, 1961 |
| 3,064,053 | Rabinowitz | Nov. 13, 1962 |

OTHER REFERENCES

Pudovik: Chem. Abst., vol. 44, col. 5800 (1950).